United States Patent Office 3,794,677
Patented Feb. 26, 1974

3,794,677
DI(LOWER)ALKYLAMINO- AND HETEROAMINO-(LOWER)ALKYL-ALPHA,ALPHA,ALPHA-TRIFLUORO-M-TOLUIC ACID ESTERS AND DERIVATIVES
William F. Bruce, Havertown, Pa., assignor to American Home Products Corporation, New York, N.Y.
No Drawing. Filed July 1, 1971, Ser. No. 159,057
Int. Cl. C07c 93/20
U.S. Cl. 260—477     5 Claims

ABSTRACT OF THE DISCLOSURE

This invention discloses new and novel di(lower)-alkylamino- and heteroamino(lower)alkyl-α,α,α-trifluoro-m-toluic acid esters and derivatives thereof including acid addition salts and quaternary ammonium compounds. The compounds have utility as central nervous system depressants useful in the calming of animals.

This invention relates to new and novel α,α,α-trifluorotoluic acid esters and derivatives thereof.

Particularly, this invention relates to compounds selected from

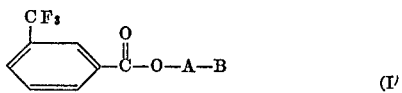

(I)

wherein A is selected from the group consisting of (lower)alkylene and B is selected from the group consisting of

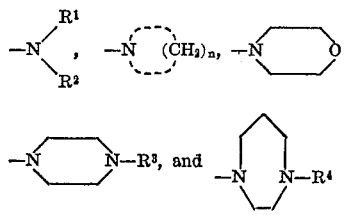

wherein $R^1$ and $R^2$ are selected from the group consisting of (lower)alkyl; $n$ is a number from about 4 to about 6; and $R^3$ and $R^4$ are selected from the group consisting of hydrogen, (lower)alkyl, phenyl, benzyl and m-(trifluoromethyl)benzoyl; and the non-toxic pharmaceutically acceptable acid addition salts and (lower)alkyl ammonium salts thereof.

More particularly, this invention relates to compounds of Formula I wherein A is a straight chain alkylene group having from about 2 to about 8 carbon atoms. Special mention is made of a number of embodiments of this invention, which includes:

2-dimethylaminoethyl-m-α,α,α-trifluorotoluate hydrochloride;
2-diethylaminoethyl-m-α,α,α-trifluorotoluate hydrochloride;
2-(N-methylpiperazino)ethyl-m-α,α,α-trifluorotoluate hydrochloride;
2-[N-(m-[trifluoromethyl]benzoylpiperazino]ethyl-m-α,α,α-trifluorotoluate hydrochloride;
α,α,α-trifluoro-m-toluic acid,
2-dibutylaminoethyl ester perchlorate;
and
dibutylmethyl[2-(α,α,α-trifluoro-m-toluoyloxy)ethyl] ammonium iodide.

When used herein and in the appended claims, the term "(lower)alkyl" contemplates hydrocarbon radicals, straight and branched chain, containing from about 1 to about 8 carbon atoms, and includes methyl, ethyl, n-propyl, i-propyl, n-butyl, t-butyl, n-pentyl, n-hexyl, 2-methylpentyl, n-octyl and the like. The term "halo" when used by itself contemplates halogens, and includes fluorine, chlorine, bromine, and iodine. The term "halide" contemplates "halo" anions. The phrases "reaction inert organic solvent;" "inert organic solvent" and the like refer to solvents which dissolve the reactants or compound in question without interfering with or changing the respective chemical properties.

The compounds of the present invention (I) may be prepared following a reaction scheme depicted by:

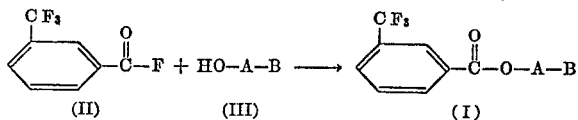

wherein A and B are as set forth previously. Generally, the m-(trifluoromethyl)-benzoylfluoride (II) is reacted by contacting with the alcohol (III) at room temperature in a reaction inert organic solvent (i.e. absolute ether) with an optional small amount of a tri(lower)alkylamine(triethylamine) for a period of time ranging up to about three days. The reaction is usually exothermic. After the reaction is complete the reaction mixture is treated with water and made basic (i.e. potassium carbonate, sodium hydroxide). The organic layer which forms (i.e. ether) is then acidified (i.e. hydrogen chloride) to provide the respective acid addition salt of Compound I which is then filtered out and crystallized from an appropriate inert organic solvent (i.e. ethanol, methylethyl ketone, acetone-methylethyl ketone and t-butanol). Quaternary ammonium derivatives of the compound of Formula I are provided by routine procedures such as providing the base of the compound of Formula I, when necessary, by treating the acid addition salt of the compound of Formula I with an appropriate base (i.e. sodium hydroxide) followed by extraction of the base in an appropriate inert organic solvent (i.e. ether). This extractant is mixed with additional reaction inert organic solvent (i.e. acetone) and treated by contacting with an appropriate (lower)alkyl halide (i.e. methyl iodide) to provide the appropriate quaternary ammonium compound which is separated off (i.e. filtration, decantation). It is also possible to convert one quaternary ammonium salt to another in which the anion is different. If the anion of the original quaternary salt forms a water-insoluble silver salt the quaternary salt will react with silver oxide in aqueous medium to form the corresponding quaternary ammonium hydroxide, the original anion being removed as a precipitate. The quaternary ammonium hydroxide solution can then be neutralized with any desired acid weak or strong to procedure a new quaternary ammonium salt in which the anion is different from that of the original salt. In this way quaternary ammonium salts in which the anion is derived from a weak acid may be prepared. By the above described methods quaternary ammonium compounds are prepared in which the anion portion is exemplified by halide, sulfate, arylsulfonate (i.e. benzenesulfonate and p-toluenesulfonate).

In accord with the present invention, the α,α,α-trifluoro-m-toluic acid ester compounds (I) of the present invention have been found to possess interesting pharmacological properties. More particularly, these compounds, in standard pharmacological tests, have exhibited utility as central nervous system depressant agents which are useful in producing a calming effect on animals.

In the pharmacological evaluation of the central nervous system depressant compounds (I) of this invention the in vivo effects of the compounds of this invention are tested as follows:

The compound is administered intraperitoneally and/or orally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate Method" [Nathan B. Eddy and Dorothy Leimbach], J. Pharmacol. Exper. Therap. 107, 385 (1953) is used to test for analgesia. The experiment is terminated by subjecting each animal to a maximal electroshock to test for anticonvulsant activity.

The compounds (I) of this invention when administered intraperitoneally in the above test procedure induce decreased motor activity at dosage levels ranging from 40.0 mg./kg. to 400.0 mg./kg. Similar results are obtained when these compounds are administered orally at a dosage level ranging from 127.0 mg./kg. to 400.0 mg./kg. There were no deaths in the test animals at the highest dose used, 400 mg./kg., both intraperitoneally and orally.

When the compounds of this invention are employed as central nervous system depressant agents to produce a calming effect they may be administered to warm-blooded animals, e.g., mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I 2-dimethylaminoethyl-m-α,α,α-trifluorotoluate

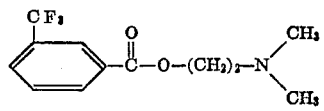

A solution of 9.5 g. of m-trifluoromethylbenzoyl fluoride in 50 ml. of absolute ether is added dropwise with stirring and cooling to a solution of 5 g. of dimethylaminoethanol, B.P. 135° C. and 5 ml. of triethylamine in 50 ml. of absolute ether. A vigorous reaction takes place. After standing for three days, the mixture is diluted with water and made alkaline with potassium carbonate. The ether layer is concentrated in vacuo, redissolved in ether and acidified with ethereal hydrogen chloride to give 11 g. of white solid, 2-dimethylaminoethyl-m-α,α,α-trifluorotoluate hydrochloride, M.P. 127–8° C. Recrystallization from acetone-methylethyl ketone gives 7 g. of white flaky crystals, M.P. 131–2° C.

*Analysis.*—Calcd. for $C_{12}H_{15}ClF_3NO_2$: C, 48.41; H, 5.00; Cl, 11.91; N, 4.71. Found: C, 48.56; H, 5.36; Cl, 12.24; N, 4.91.

In a similar manner, using the appropriate starting materials, the following compounds are provided:

2-(di-n-propylamino)ethyl-m-α,α,α-trifluorotoluate hydrochloride;

2-diisobutylaminoethyl-m-α,α,α-trifluorotoluate sulfate;

2-(di-t-butylamino)ethyl-m-α,α,α-trifluorotoluate hydrochloride;

1-methyl-2-(di-n-propylamino)ethyl-m-α,α,α-trifluorotoluate hydrochloride:

2-diisobutylamino-1-methylethyl-m-α,α,α-trifluorotoluate hydrochloride;

2-(di-t-butylamino)-1-methylethyl-m-α,α,α-trifluorotoluate hydrochloride;

3-(diisopropylamino)propyl-m-α,α,α-trifluorotoluate phosphate;

3-(di-n-butylamino)propl-m-α,α,α-trifluorotoluate hydrochloride;

3-(di-n-hexylamino)propyl-m-α,α,α-trifluorotoluate hydrochloride;

3-(di-sec-butylamino)propyl-m-α,α,α-trifluorotoluate sulfate;

6-diethylaminohexyl-m-α,α,α-trifluorotoluate hydrochloride; and 2-(di-n-octylamino)ethyl-m-α,α,α-trifluorotoluate hydrochloride.

EXAMPLE II 2-diethylaminoethyl-m-α,α,α-trifluorotoluate

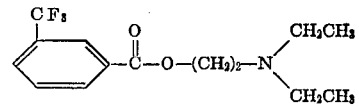

A solution of 9.5 g. of m-trifluoromethylbenzoylfluoride in 50 ml. of absolute ether is added dropwise with cooling and stirring to a solution of 6.5 g. of diethylaminoethanol, B.P. 163° C., in 50 ml. of absolute ether and 5 ml. of triethylamine. A vigorous reaction occurs. After standing two days, 80 ml. of water is added and the mixture made alkaline by the addition of potassium carbonate. The ether layer is acidified with ethereal hydrogen chloride to give 11 g. of white crystalline powder, 2-diethylaminoethyl-m-α,α,α-trifluorotoluate hydrochloride, M.P. 158–9° C. after crystallization from methylethylketone.

*Analysis.*—Calcd. for $C_{14}H_{19}ClF_3NO_2$: C, 51.62; H, 5.88; Cl, 10.88; F, 17.50; N, 4.62. Found: C, 51.81; H, 6.01; Cl, 11.05; F, 17.1; N, 4.62.

In a similar manner, using the appropriate starting materials, the following compounds are provided:

2-diisopropylaminoethyl-m-α,α,α-trifluorotoluate hydrochloride;

2-(di-sec-butylamino)ethyl-m-α,α,α-trifluorotoluate hydrochloride;

1-methyl-2-diisopropylaminoethyl-m-α,α,α-trifluorotoluate hydrochloride;

2-(di-sec-butylamino)-1-methylethyl-m-α,α,α-trifluorotoluate sulfate;

4-(di-n-hexylamino)butyl-m-α,α,α-trifluorotoluate hydrochloride;

2-(di-n-butylamino)-1-methylethyl-m-α,α,α-trifluorotoluate phosphate;

8-diethylaminooctyl-m-α,α·α-trifluorotoluate hydrochloride;

2-(di-n-butylamino)ethyl-m-α,α,α-trifluorotoluate hydrobromide;

3-(di-t-butylamino)propyl-m-α,α,α-trifluorotoluate citrate; and 3-(di-n-propylamino)propyl-m-α,α,α-trifluorotoluate hydrochloride.

EXAMPLE III 2-(N-methylpiperazino)ethyl-m-α,α,α-trifluorotoluate

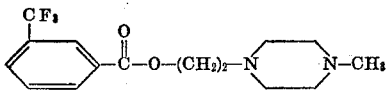

A solution of 9.5 g. of m-trifluoromethylbenzoylfluoride in 25 ml of absolute ether is added with stirring and cooling to a solution of 7.5 g. of β-hydroxyethyl-N'-methylpiperazine in 25 ml. of absolute ether with 4 ml. of triethylamine. A milky turbidity appears, accompanied by a mild exothermic reaction. After standing overnight, the mixture is treated with water and potassium carbonate, and the ethereal layer is acidified by an ethereal solution of hydrogen chloride, to give 10 g. of white powdery solid, 2 - (N-methylpiperazino)ethyl - m-α,α,α-trifluorotoluate dihydrochloride, M.P. 207–8° C. after recrystallization from ethanol.

*Analysis.*—Calcd. for $C_{15}H_{21}Cl_2F_3N_2O_2$: C, 46.28; H, 5.44; Cl, 18.22; F, 14.64; N, 7.20. Found: C, 46.00; H, 5.67; Cl, 18.2; F, 14.3; N, 7.14.

In a similar manner, using the appropriate starting materials, the following compounds are provided:

2-(N-ethylpiperazino)ethyl-m-α,α,α-trifluorotoluate hydrochloride;
2-(N-benzylpiperazino)ethyl-m-α,α,α-trifluorotoluate hydrochloride;
6-(N-methylpiperazino)hexyl-m-α,α,α-trifluorotoluate hydrochloride;
2-morpholinoethyl-m-α,α,α-trifluorotoluate sulfate;
2-(N-methylhomopiperazino)ethyl-m-α,α,α-trifluorotoluate hydrochloride;
2-(N-ethylhomopiperazino)ethyl-m-α,α,α-trifluorotoluate phosphate;
3-(N-hexylhomopiperazino)propyl-m-α,α,α-trifluorotoluate hydrochloride;
2-piperidinoethyl-m-α,α,α-trifluorotoluate hydrochloride;
2-pyrrolidinoethyl-m-α,α,α-trifluorotoluate citrate;
1-methyl-2-(N-methylpiperazino)ethyl-m-α,α,α-trifluorotoluate hydrochloride;
2-(N-ethylpiperazino)-1-methylethyl-m-α,α,α-trifluorotoluate sulfate;
2-(N-benzylpiperazino)-1-methylethyl-m-α,α,α-trifluorotoluate hydrochloride;
1-methyl-2-morpholinoethyl-m-α,α,α-trifluorotoluate maleate;
1-methyl-2-(N-methylhomopiperazino)ethyl-m-α,α,α-trifluorotoluate hydrochloride;
2-(N-ethylhomopiperazino)-1-methylethyl-m-α,α,α-trifluorotoluate sulfate;
1-methyl-2-piperidinoethyl-m-α,α,α-trifluorotoluate hydrochloride;
1-methyl-2-pyrrolidinoethyl-m-α,α,α-trifluorotoluate phosphate;
2-(N-phenylpiperazino)ethyl-m-α,α,α-trifluorotoluate hydrochloride;
1-methyl-2-(N-phenylpiperazino)ethyl-m-α,α,α-trifluorotoluate phosphate;
3-(N-methylpiperazino)propyl-m-α,α,α-trifluorotoluate hydrochloride;
3-(N-ethylpiperazino)propyl-m-α,α,α-trifluorotoluate hydrochloride;
3-(N-benzylpiperazino)propyl-m-α,α,α-trifluorotoluate hydrochloride;
3-(N-phenylpiperazino)propyl-m-α,α,α-trifluorotoluate hydrochloride;
3-morpholinopropyl-m-α,α,α-trifluorotoluate hydrochloride;
3-(N-methylhomopiperazino)propyl-m-α,α,α-trifluorotoluate phosphate;
3-(N-ethylhomopiperazino)propyl-m-α,α,α-trifluorotoluate hydrochloride;
3-piperidinopropyl-m-α,α,α-trifluorotoluate hydrochloride; and
3-pyrrolidinopropyl-m-α,α,α-trifluorotoluate hydrochloride.

EXAMPLE IV

2-[-(m-[trifluoromethyl]benzoylpiperazino]ethyl-m-α,α,α-trifluorotoluate

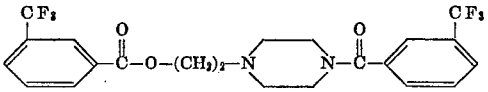

A solution of 10 g. of m-trifluoromethylbenzoylfluoride in 25 ml. of absolute ether is added dropwise with stirring and cooling to a solution of 6.5 g. of N'β-hydroxyethylpiperazine layered under 100 ml. of absolute ether. After standing overnight, the mixture is treated with 100 ml. of water and made alkaline with sodium hydroxide. The dried ether solution is acidified by ethereal hydrogen chloride to give 15 g. of white micro crystals, 2-[N-(m-[trifluoromethyl] - benzoylpiperazino]ethyl - m-α,α,α-trifluorotoluate hydrochloride, M.P. 174–6° C.; recrystallized from ethanol the yield was 9 g., M.P. 175–6° C.

*Analysis.*—Calcd. for $C_{22}H_{21}ClF_6N_2O_3$: C, 51.72; H, 4.14; Cl, 6.49; F, 22.32; N, 5.48. Found: C, 51.60; H, 4.13; Cl, 7.0; F, 22.2; N, 5.39.

EXAMPLE V

α,α,α-Trifluoro-m-toluic acid, 2-dibutyl-aminoethyl ester

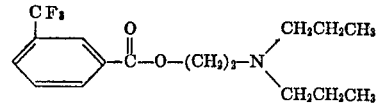

A solution of 9.5 g. of m-trifluorobenzoylfluoride in 50 ml. of absolute ether is added slowly with stirring and cooling to a solution of 9 g. of 2-di-n-butylaminoethanol in 100 ml. of absolute ether. After standing overnight, the reaction mixture is treated with 80 ml. of water and made alkaline by addition of sodium hydroxide. The ether layer is acidified with perchloric acid to give 15 g. of white solid, α,α,α-trifluoro-m-toluic acid, 2-dibutylaminoethyl ester perchlorate. Recrystallization from t-butanol gives 10 g., M.P. 82–3° C.

*Analysis.*—Calcd. for $C_{18}H_{27}ClF_3O_6$: C, 48.49; H, 6.11; Cl, 7.95; F, 12.78. Found: C, 48.54; H, 6.42; Cl, 7.88; F, 12.5; N, 2.98.

EXAMPLE VI

Dibutylmethyl[2-(α,α,α-trifluoro-m-toluoyloxy)ethyl] ammonium iodide

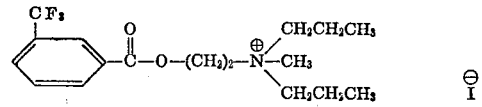

A solution of 4 g. of Example V in 10 ml. of water and 3 ml. of 40% sodium hydroxide is extracted with ether and concentrated to give 2.5 g. of the corresponding base. This base in 8 ml. of acetone gives with 2 ml. of methyl iodide, after two hours, 3.5 g. of white solid, dibutylmethyl[2-(α,α-trifluoro-m - toluoyloxy)ethyl]ammonium iodide, M.P. 134–5° C.

*Analysis.*—Calcd. for $C_{19}H_{29}F_3INO_2$: C, 46.83; H, 6.00; F, 11.70; I, 26.04; N, 2.87. Found: C, 46.69; H, 5.82; F, 11.6; I, 25.8; N, 3.07.

In a similar manner, using the appropriate starting materials, the following compounds are provided:

trimethyl[2-(α,α,α-trifluoro-m-toluoyloxy)ethyl] ammonium iodide;
diethylmethyl[2-(α,α,α-trifluoro-2-toluoyloxy)ethyl] ammonium iodide;
N,N-dimethyl-N'-methyl[2-(α,α,α-trifluoro-m-toluoyloxy] piperazinium diiodide;

2-[N-(m-[trifluoromethyl]benzoylpiperazino]ethyl-m-α,α,α-trifluorotoluate methiodide;
methyldipropyl[2-methyl-2-(α,α,α-trifluoro-m-toluoyloxy)ethyl]ammonium bromide;
tripropyl[3-(α,α,α-trifluoro-2-toluoyloxy)propyl]ammonium iodide; and
diethylmethyl[8(α,α,α-trifluoro-2-toluoyloxy)octyl]ammonium iodide.

What is claimed is:
1. A compound of the formula

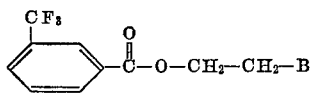

wherein B is dimethylamino, diethylamino, dipropylamino, or dibutylamino and the non-toxic pharmaceutically acceptable acid addition salts thereof and the methyl ammonium salts thereof.

2. A compound, as defined in claim 1, which is: 2-dimethylaminoethyl-m-α,α,α-trifluorotoluate hydrochloride.
3. A compound, as defined in claim 1, which is: 2-diethylaminoethyl-m-α,α,α-trifluorotoluate hydrochloride.
4. A compound, as defined in claim 1, which is: α,α,α-trifluoro-m-toluic acid, 2-dibutylaminoethyl ester perchlorate.
5. A compound, as defined in claim 1, which is: dibutylmethyl[2-(α,α,α-trifluoro-m - toluoyloxyl)ethyl]ammonium iodide.

References Cited

Niemann, Chemical Abstracts, vol. 64, 2929g (1966).

LORRAINE A. WEINBERGER, Primary Examiner

P. J. HAGAN, Assistant Examiner

U.S. Cl. X.R.

260—239 BC, 247.2 B, 268 PH, 268 C, 268 R, 293.81, 326.3